US011862839B2

(12) United States Patent
Stelle, IV et al.

(10) Patent No.: US 11,862,839 B2
(45) Date of Patent: Jan. 2, 2024

(54) MOUNT FOR COUPLING AN ANTENNA ALIGNMENT DEVICE TO AN ANTENNA WITH NON-PLANAR EXTERNAL SURFACE

(71) Applicant: Viavi Solutions Inc., San Jose, CA (US)

(72) Inventors: Raleigh Benton Stelle, IV, Indianapolis, IN (US); Adam Woolsey, Indianapolis, IN (US)

(73) Assignee: Viavi Solutions Inc., Chandler, AZ (US)

( * ) Notice: Subject to any disclaimer, the term of this patent is extended or adjusted under 35 U.S.C. 154(b) by 0 days.

(21) Appl. No.: 17/533,747

(22) Filed: Nov. 23, 2021

(65) Prior Publication Data

US 2023/0163442 A1 May 25, 2023

(51) Int. Cl.
*H01Q 1/12* (2006.01)

(52) U.S. Cl.
CPC ............... *H01Q 1/12* (2013.01); *H01Q 1/125* (2013.01)

(58) Field of Classification Search
CPC ............. H01Q 1/12; H01Q 1/125; H01Q 1/20
See application file for complete search history.

(56) References Cited

U.S. PATENT DOCUMENTS

| | | | | |
|---|---|---|---|---|
| 6,232,928 B1 * | 5/2001 | Zimmerman | H01Q 1/1242 343/890 |
| 8,849,288 B2 * | 9/2014 | Vilhar | H04W 16/28 455/67.11 |
| 2011/0225804 A1 * | 9/2011 | Clifford | H01Q 1/1207 269/55 |
| 2014/0227985 A1 * | 8/2014 | Sanford | H01Q 3/08 455/90.3 |
| 2016/0211574 A1 * | 7/2016 | Dundorf | H01Q 1/44 |
| 2016/0240910 A1 * | 8/2016 | Balter | G01S 3/46 |
| 2017/0069963 A1 * | 3/2017 | Wattwood | H01Q 1/1257 |
| 2017/0141463 A1 * | 5/2017 | Wattwood | H01Q 3/14 |
| 2019/0027832 A1 * | 1/2019 | Renilson | H01Q 15/16 |
| 2020/0196163 A1 * | 6/2020 | Wattwood | H04W 4/20 |
| 2022/0174221 A1 * | 6/2022 | Frischman | H04N 23/695 |
| 2023/0163442 A1 * | 5/2023 | Stelle, IV | H01Q 1/125 343/878 |

* cited by examiner

*Primary Examiner* — Jason Crawford
(74) *Attorney, Agent, or Firm* — DLA PIPER LLP (US)

(57) ABSTRACT

An example mount may include a strap (or any other type of clamping mechanism) engaging with an external surface of an antenna. The strap may be connected to a strap base with a canted wall also engaging with the external surface of the antenna. The engagement of the canted wall may be through an abutment of the canted wall against the corresponding external surface of the antenna at a single point or along a single line. Because the entirety of the canted wall does not have to be flush with the corresponding external surface of the antenna, the mount can couple to any kind of antenna form factor, such as curved antennas and antennas with imperfections and protrusions.

20 Claims, 9 Drawing Sheets

MOUNT FOR COUPLING AN ANTENNA ALIGNMENT DEVICE TO AN ANTENNA WITH NON-PLANAR EXTERNAL SURFACE

BACKGROUND

Modern communication systems rely heavily on wireless signals transmitted and received by antennas. On the transmit side, antennas receive fluctuating electrical currents through wires from connected circuitry and generate wireless signals as electromagnetic fields corresponding to the fluctuating electrical currents. On the receive side, antennas convert electromagnetic fields of the received wireless signals to electrical currents carried through wires to the connected circuitry. Because of directional oscillation of electrical and magnetic fields, wireless signaling through the transmittal and receipt of electromagnetic fields is inherently directional: heavily influenced by the location of the signal source, multipathing, beamforming, and/or other aspects associated with electromagnetic fields and electromagnetic radiation. Therefore, for an optimal bandwidth and signal strength, antennas—both on the transmit and receive sides—may require precise alignments with respect to each other.

The alignments are generally performed using an antenna alignment device. The antenna alignment device is coupled to an antenna to measure the antenna's alignment parameters such as roll, tilt, and azimuth. The coupling between the antenna alignment device and the antenna is provided by a mount or a bracket. A coupling mount therefore may have to provide engagement surfaces (or engagement components generally) to each of the antenna and the antenna alignment device.

Conventional mounts generally have planar form factors, e.g., having perpendicular walls. While the planar form factors of these conventional mounts may be well suited for antennas with similar planar external surfaces, these conventional mounts are generally not suitable for antennas with other form factors, such as antennas with curved surfaces. Furthermore, the antennas may have warping, protrusions, and other imperfections that may impinge on the stability of (and generally, the compatibility of) a planar mount that has to be coupled flush with a planar antenna surface.

A significant improvement of the mounts for coupling antennas with antenna alignment devices is therefore desired.

SUMMARY

Embodiments disclosed herein attempt to solve the aforementioned technical problems and may provide other solutions as well. An example mount may include a strap (or any other type of clamping mechanism) engaging with an external surface of an antenna. The strap may be connected to a strap base with a canted wall also engaging with the external surface of the antenna. The engagement of the canted wall may be through an abutment of the canted wall against the corresponding external surface of the antenna at a single point or along a single line. Because the entirety of the canted wall does not have to be flush with the corresponding external surface of the antenna, the mount can couple to any kind of antenna form factor such as curved antennas and antennas with imperfections and protrusions.

In an example embodiment, a mount configured to couple an antenna alignment device to an antenna is provided. The mount may include a strap configured to engage with an external surface of an antenna and maintain a coupling between an antenna alignment device and the external surface of the antenna; and a strap base, that the strap is connected to, comprising a wall canted at an angle configured to form an engagement contact with a corresponding portion of the external surface of the antenna, the engagement contact comprising a single point of contact formed by an abutment of an edge of the wall with the corresponding portion of the external surface of the antenna.

In another example embodiment, another mount configured to couple an antenna alignment device to an antenna is provided. The mount may include a first portion configured to engage with a first external surface of an antenna and maintain a coupling between an antenna alignment device and the antenna; and a second portion having a wall canted at an angle configured to form an engagement contact with a second external surface of the antenna, the engagement contact comprising a single point of contact formed by an abutment of an edge of the wall with the second external surface of the antenna.

In yet another example embodiment, a method is provided and may include engaging a strap with an external surface of an antenna to maintain a coupling between an antenna alignment device and the external surface of the antenna; and abutting a canted wall, formed at the strap base that the strap is connected to, against a corresponding portion of the external surface of the antenna such that: an edge of the canted wall forms a single point of engagement contact with the corresponding portion of the external surface of the antenna.

DETAILED DESCRIPTION OF SEVERAL EMBODIMENTS

Figure 1:
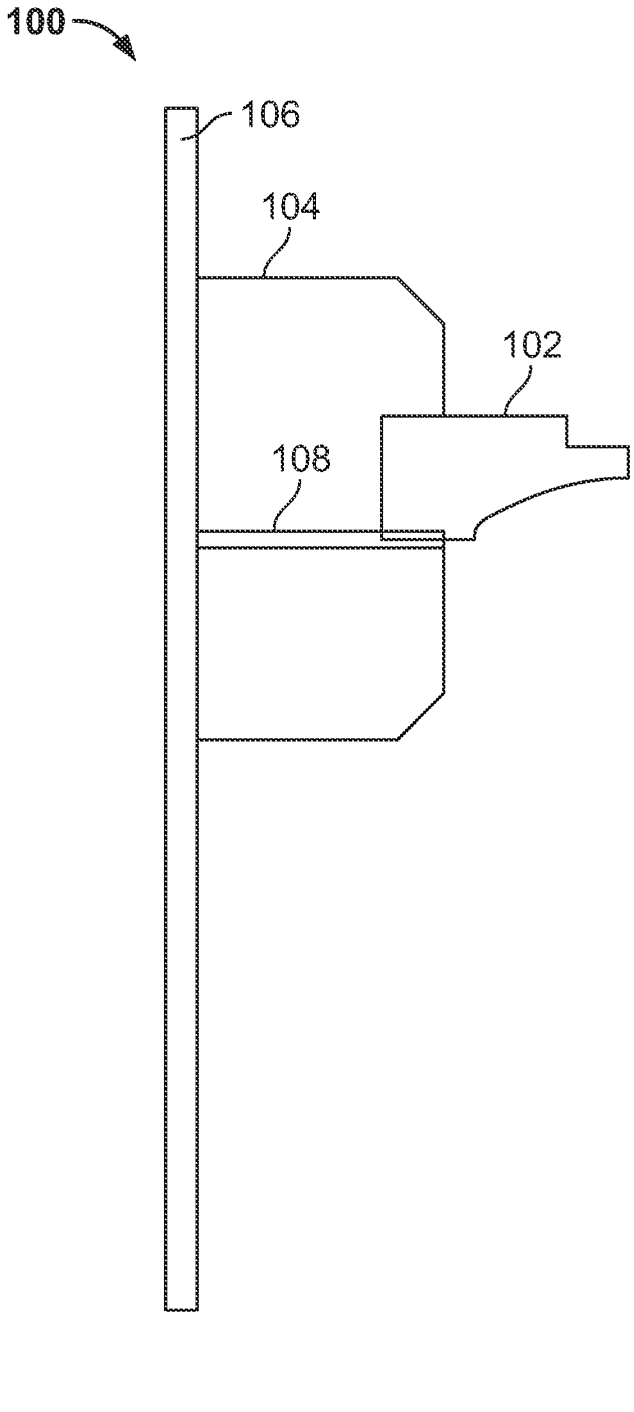
FIG. 1 shows an example environment for antenna alignment, based on the principles disclosed herein.

Antenna alignment measurement is generally predicated on a proper coupling between the antenna and the antenna alignment device. The existing mounts are too restrictive—generally configured for antennas with ideal planar form factors—and therefore not be compatible with antennas having curved form factors or having other imperfections in their form factors. Described herein are examples of mounts that attempt to reduce such incompatibility and allow for more flexibility in coupling to different types of antenna form factors.

The several examples of mounts described herein may provide a more flexible mounting arrangement between an antenna alignment device and antennas with different form factors. An example mount may include a clamp, e.g., a strap clamp, a lip clamp, an extension clamp, and/or any other type of clamp, which may have a first portion (e.g., strap) that may engage with a first external surface of an antenna. For instance, the first portion may include a strap that may wrap around the antenna. A second portion of the mount may include a base structure (e.g., a strap base) that may engage with a second external surface of the antenna. For instance, the base structure may have one or more components that may abut against the second external surface of the antenna.

For example, the base structure of the mount may comprise a canted wall. The canted wall may be at an angle to other walls in the base structure, e.g., the canted wall may not necessarily be perpendicular to the other walls. When the base is engaged to the antenna at a corresponding external surface, an edge of the canted wall may abut against the external surface at a single point or a single line of contact. In other words, the entirely of the canted wall may not have to be flush with the external surface of the antenna. Because of the single point (or single line) of contact in the external surface of the antenna, the antenna does not have to be in a planar form factor. The mount has flexibility to be engaged with curved surfaces, protruding surfaces, and surfaces with imperfections.

The base structure may comprise a second canted wall that may couple to the antenna alignment device. The second canted wall, based on its angled orientation to the other parts of the base structure, may facilitate an angled mounting of the antenna alignment device. Such angled mounting may be desired when the antenna has a larger form factor that may physically interfere with the antenna alignment device. For instance, cylindrical antennas with larger radii may have curvatures that may obstruct a non-angular mounting of the antenna alignment devices. The second canted wall may further allow for another layer of flexibility of mounting the antenna alignment device at an angled orientation.

Although the below description has several examples of mounts using strap clamps, these are just provided for illustrative purposes only; and any other form of clamping mechanism (e.g., lip clamp, extension clamp) should be considered within the scope of this disclosure.

FIG. 1 shows an example environment 100 for antenna alignment, based on the principles disclosed herein. The example environment 100 includes an antenna 104, which may be disposed on a pole 106. The pole 106 is just an example, and the antenna 104 may be located on any type of structure such as an antenna tower, rooftop, treetop, building wall, vehicle top, satellite, and/or any other type of structure. Furthermore, the antenna 104 can be any type of antenna, including a dome antenna, a sector antenna, a microwave antenna, an omnidirectional antenna, a loop antenna, a multibeam antenna, a Yagi-type antenna, and/or any type of antenna that may have to be aligned for optimal performance. An antenna alignment device 102 may be used for aligning the antenna 104. The antenna alignment device 102 may output alignment information such as roll, tilt, and/or azimuth. Using the alignment information, a user may align the antenna 104 such that it may have a desired roll, tilt, and/or azimuth.

The antenna alignment device 102 may be coupled to the antenna 104 using a mount 108. The mount 108 may be any kind of mechanical coupling equipment (e.g., mounting bracket) that may allow the antenna alignment device 102 to be coupled to the antenna 104, decoupled from the antenna 104, and or adjusted vis-à-vis the antenna 104. The mount 108 may include any type of coupling mechanism such as lip clamps, extension clamps, and strap clamps. The antenna 104 may not necessarily have planar external surfaces, and this disclosure describes several non-limiting examples of mounts 108 that that may couple the antenna 104 with non-planar external surface with the antenna alignment device 102.

Figure 2A:
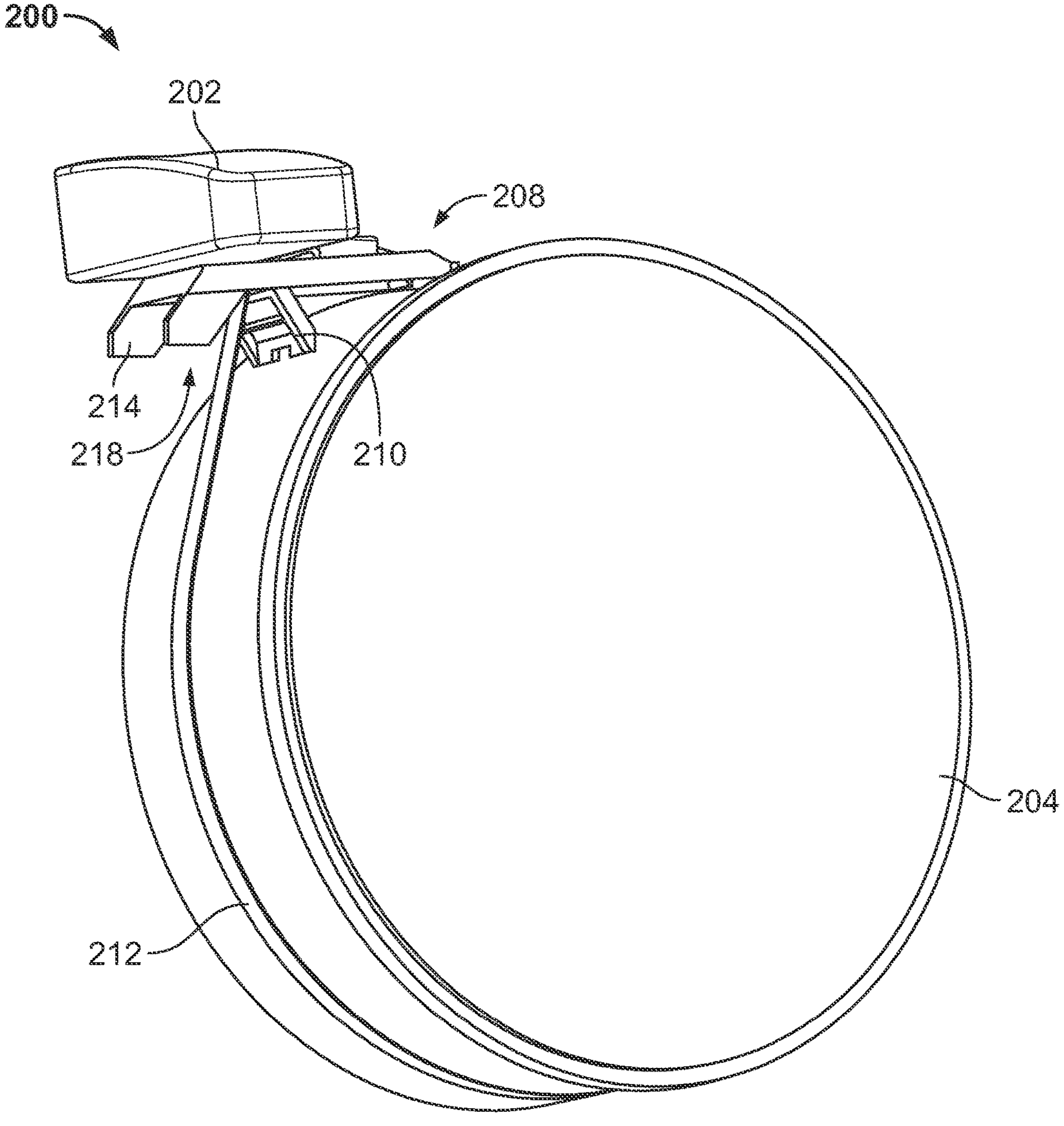
FIGS. 2A-2C show different perspective views of an example environment of using a mount for coupling an antenna alignment device with an antenna, based on the principles disclosed herein.
Figure 2B:
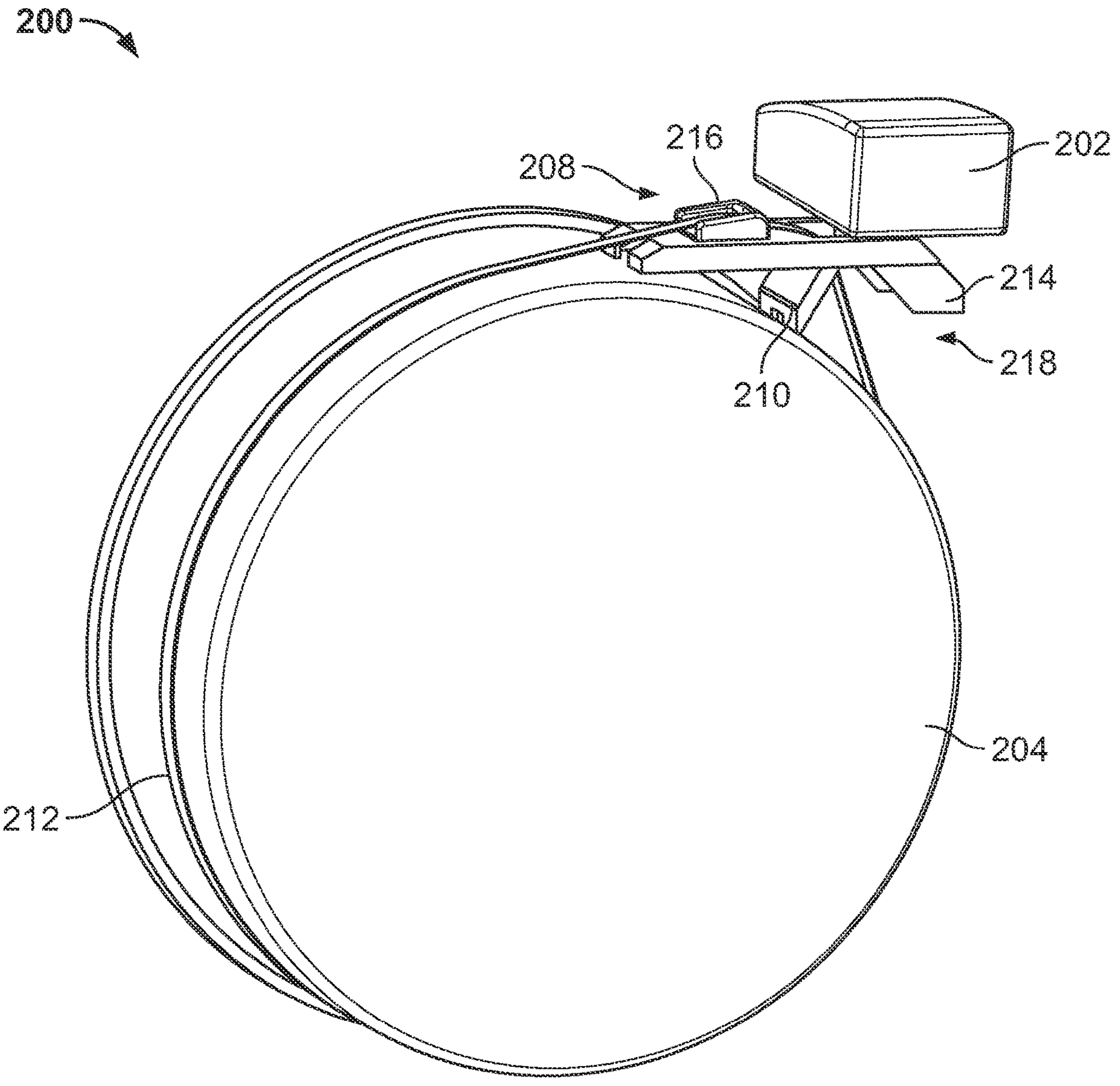
Figure 2C:
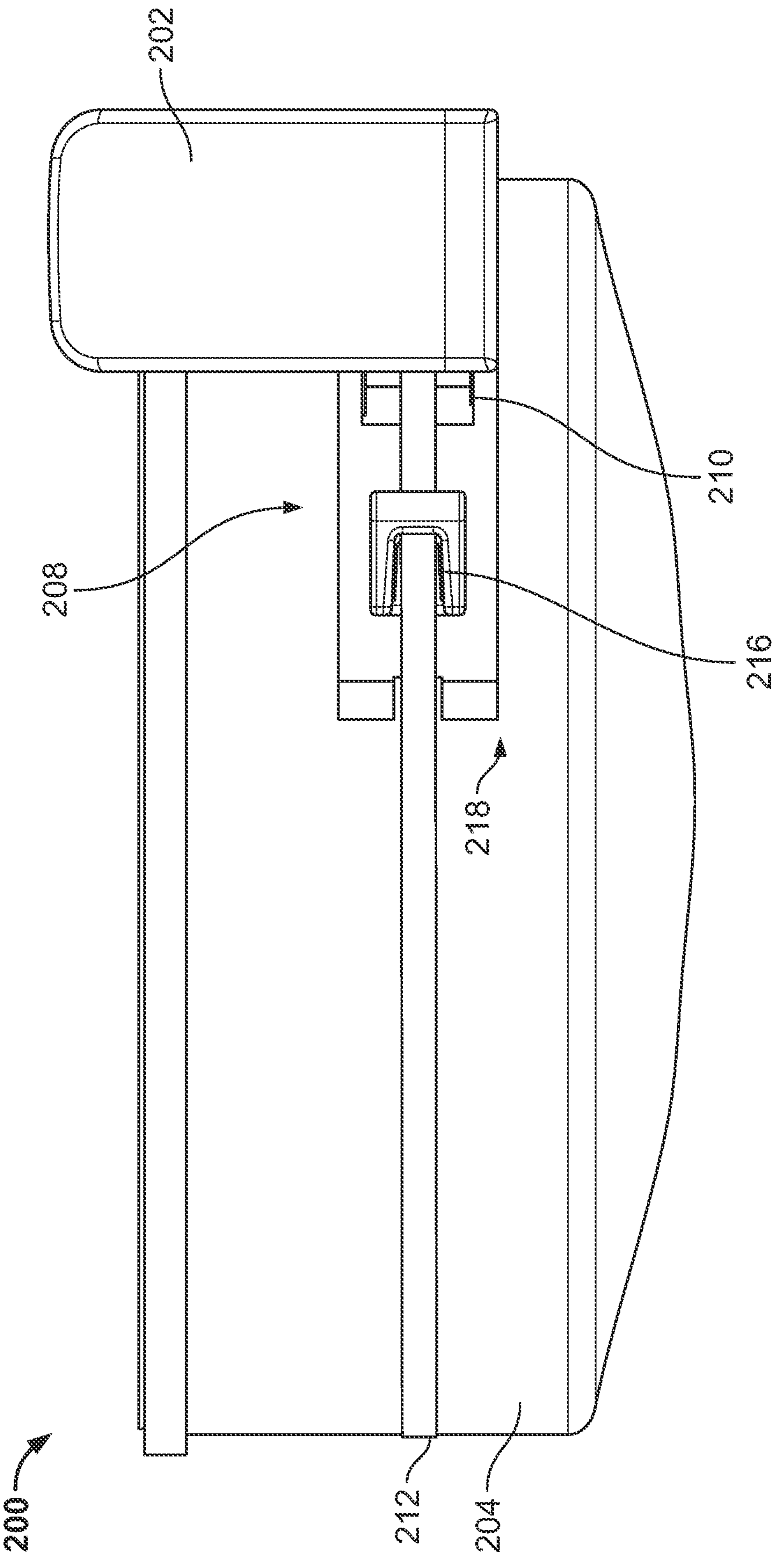

FIGS. 2A-2C show different perspective views of an example environment 200 of using a mount for coupling an antenna alignment device with an antenna, based on the principles disclosed herein. Particularly, FIG. 2A shows a front view, FIG. 2B shows a back view, and FIG. 2C shows a top view of a mount 208 coupling an antenna alignment device 202 with an antenna 204. In the illustrated example environment 200, the antenna 204 may be a 3 foot diameter microwave antenna.

The mount 208 may include a strap 212 and a strap base 218. The strap 212 may engage with the external surface of the antenna 204. To facilitate the engagement, the strap 212 may be connected to the strap base 218. Within the strap base 218, there may be a ratchet 216 that may be used to tighten or loosen the engagement of the strap 212 with the external surface of the antenna 204. The strap base 218 may also provide a coupling (e.g., a housing to receive a screw) for the antenna alignment device 202.

The strap base 218 may further comprise a canted wall 210. The canted wall 210 may be at an angle (e.g., not necessarily perpendicular) to the other walls of the strap base 218. Due to this angle, the canted wall 210 may have only one point of contact (alternatively, a single line of contact) with the external surface of the antenna 204. The point of contact (or line of contact) may be along an edge of the canted wall 210 that may abut against the external surface of the antenna. This edge abutment along a single point (or single line) of contact may allow the mount 208 to be coupled to antennas of non-planar form factors. For instance, the mount 208 may be coupled to a curved external surface of the antenna 204. The curved surface may not necessarily be the designed form factor of the antenna 204. The curved surface (or any other type of non-planar surface) may also be formed by warping and/or other imperfections within the surface of the antenna, and the canted wall 210 may be generally abutted to any point in the curve.

The canted wall 210 may allow for more flexibility and convenience of attachment compared to conventional planar brackets (often having perpendicular walls) that may have to be flush with the planar surfaces of an antenna. Because of the single point (or a single line) of contact, the form factor of the canted wall 210 does not necessarily have to match the form factor of the antenna, unlike the conventional planar brackets. Furthermore, as a flush (or a snug) fit is not necessarily required, the canted wall 210 may allow the strap base 218 to be clear from other obstructions within the antenna 204. For example, there may be components protruding from the external surface of the antenna 204 such as wires, imperfections, and/or the shape of the antenna 204 itself; and the canted wall 210 may allow for the strap base 218 to be clear of the protruding components.

As shown, the strap 212 may engage with a first portion of the external surface of the antenna 204 and the canted wall 210 may engage with a second portion of the external surface of the antenna 204. The first portion and the second portion may be different to maintain a separate engagement of the strap 212 and the canted wall 210 with the antenna 204. Alternatively, the first and second portions may be at least partially overlapping for the strap 212 and the canted wall 210 to engage the antenna 204 at nearby locations or the same location. The force of engagement of the strap 212 and the canted wall 210 may be controlled using the ratchet 216. For example, when the ratchet 216 is tightened, the abutment force between the canted wall 210 and the corresponding portion of the external surface of the antenna 204 may increase. When the ratchet 216 is loosened, the abutment force between the canted wall 210 and the corresponding portion of the external surface of the antenna 204 may decrease.

Figure 5C:
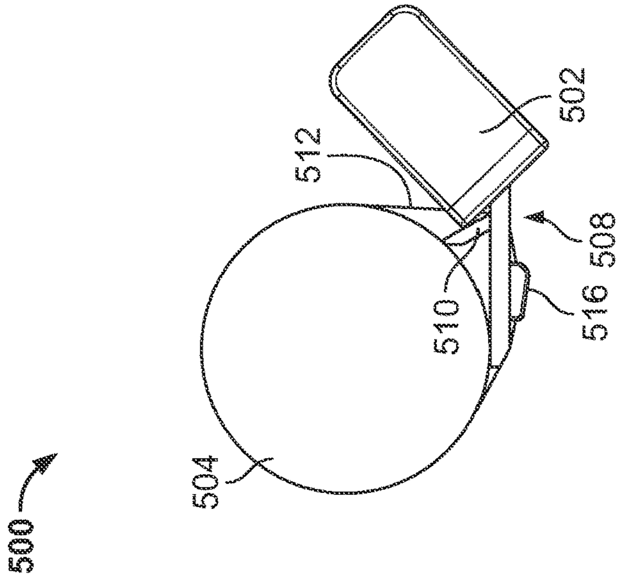
FIGS. 5A-5C show different perspective views of another example environment of using a mount for coupling an antenna alignment device with an antenna, based on the principles disclosed herein.
Figure 5B:
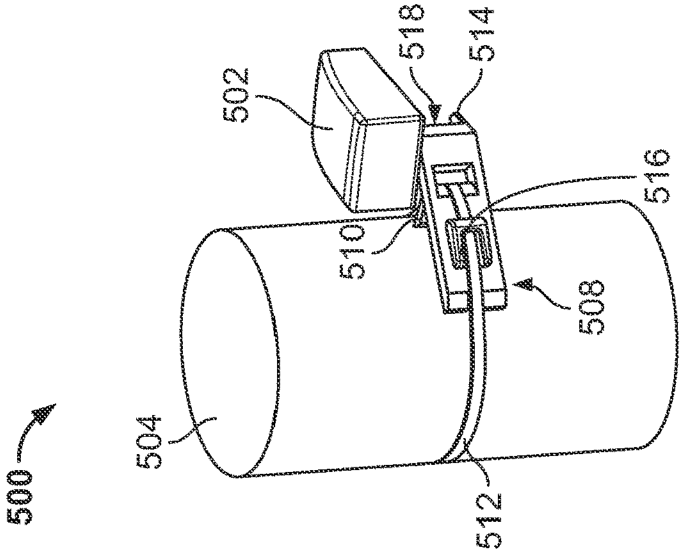
Figure 5A:
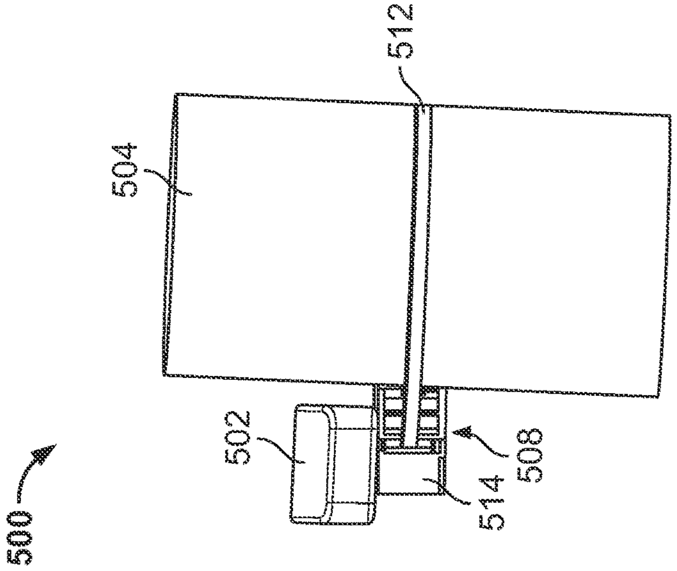

The strap base 218 may also include a second canted wall 214 that may be also be used for coupling the antenna alignment device 202 with the strap base 218. Although not shown in FIGS. 2A-2C, the coupling of the antenna alignment device 202 with the canted wall 214 may facilitate an angular orientation of the antenna alignment device 202 with respect to the antenna 204 (e.g., as shown in FIGS. 5A-5C).

Figure 3C:
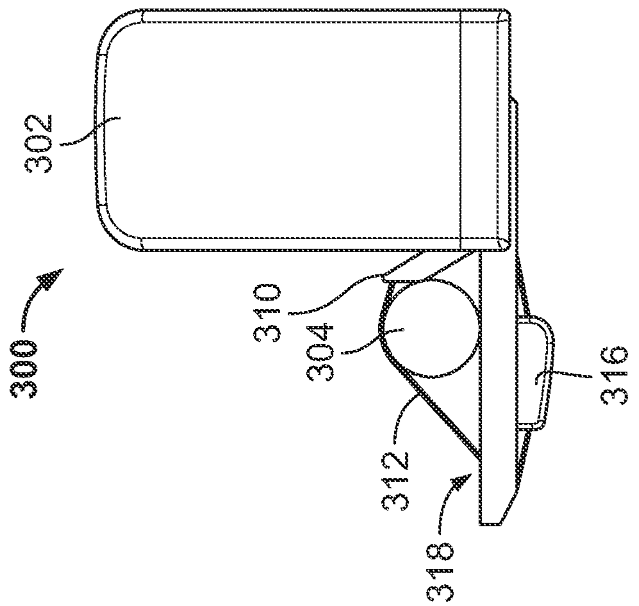
FIGS. 3A-3C show different perspective views of another example environment of using a mount for coupling an antenna alignment device with an antenna, based on the principles disclosed herein.
Figure 3B:
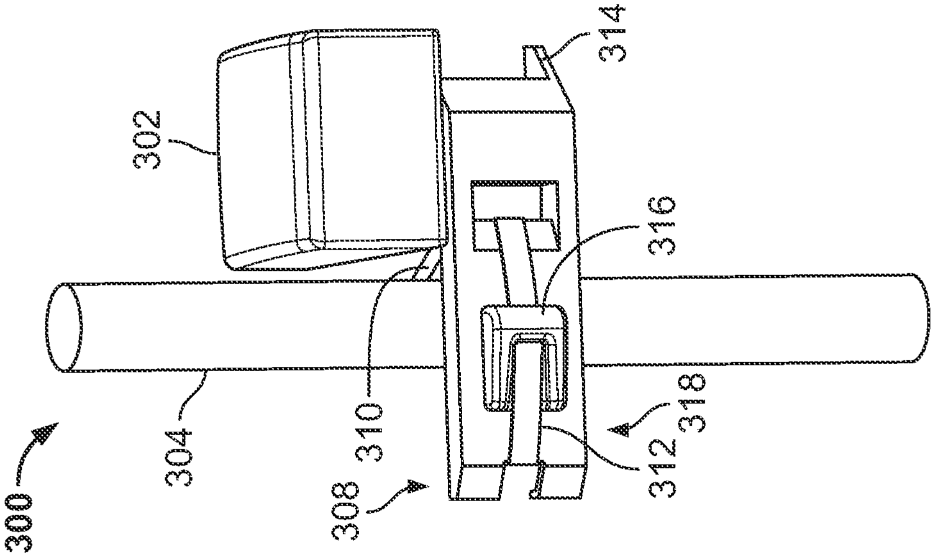
Figure 3A:
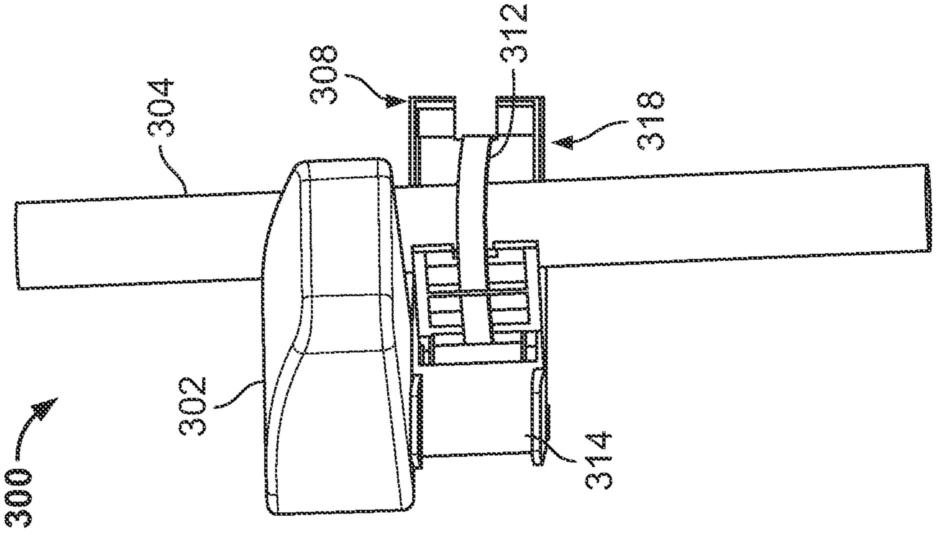

FIGS. 3A-3C show different perspective views of another example environment 300 of using a mount for coupling an antenna alignment device with an antenna, based on the principles disclosed herein. Particularly, FIG. 3A shows a front view, FIG. 3B shows a back view, and FIG. 3C shows a top view of a mount 308 coupling an antenna alignment device 302 with an antenna 304. In the illustrated example environment 300, the antenna 304 may be 76 mm omnidirectional antenna.

The mount 308 may include a strap 312 and a strap base 318. The strap 312 may engage with the external surface of the antenna 304. To facilitate the engagement, the strap 312 may be connected to the strap base 318. Within the strap base 318, there may be a ratchet 316 that may be used to tighten or loosen the engagement of the strap 312 with the external surface of the antenna 304. The strap base 318 may also provide a coupling (e.g., a housing to receive a screw) for the antenna alignment device 302.

The strap base 318 may further comprise a canted wall 310. The canted wall 310 may be at an angle (e.g., not necessarily perpendicular) to the other walls of the strap base 318. Due to this angle, the canted wall 310 may have only one point of contact (alternatively, a single line of contact) with the external surface of the antenna 304. The point of contact (or line of contact) may be along an edge of the canted wall 310 that may abut against the external surface of the antenna. This edge abutment along a single point (or single line) of contact may allow the mount 308 to be coupled to antennas of non-planar form factors. For instance, the mount 308 may be coupled to a curved external surface of the antenna 304. The curved surface may not necessarily be the designed form factor of the antenna 304. The curved surface (or any other type of non-planar surface) may also be formed by warping and/or other imperfections within the surface of the antenna, and the canted wall 310 may generally be abutted to any point in the curve.

The canted wall 310 may allow for more flexibility and convenience of attachment compared to conventional planar brackets (often having perpendicular walls) that may have to be flush with the planar surfaces of an antenna. Because of the single point (or a single line) of contact, the form factor of the canted wall 310 does not necessarily have to match the form factor of the antenna, unlike the conventional planar brackets. Furthermore, as a flush (or a snug) fit is not necessarily required, the canted wall 310 may allow the strap base 318 to be clear from other obstructions within the antenna 304. For example, there may be components protruding from the external surface of the antenna 304 such as wires, imperfections, and/or the shape of antenna 304 itself; and the canted wall 310 may allow for the strap base 318 to be clear of the protruding components.

As shown, the strap 312 may engage with a first portion of the external surface of the antenna 304 and the canted wall 310 may engage with a second portion of the external surface of the antenna 304. The first portion and the second portion may be different to maintain a separate engagement of the strap 312 and the canted wall 310 with the antenna 304. Alternatively, the first and second portions may be at least partially overlapping for the strap 312 and the canted wall 310 to engage the antenna 304 at nearby locations or the same location. The force of engagement of the strap 312 and the canted wall 310 may be controlled using the ratchet 316. For example, when the ratchet 316 is tightened, the abutment force between the canted wall 310 and the corresponding portion of the external surface of the antenna 304 may increase. When the ratchet 316 is loosened, the abutment force between the canted wall 310 and the corresponding portion of the external surface of the antenna 304 may decrease.

The strap base 318 may also include a second canted wall 314 that may be also be used for coupling the antenna alignment device 302 with the strap base 318. Although not shown in FIGS. 3A-3C, the coupling of the antenna alignment device 302 with the canted wall 314 may facilitate an angular orientation of the antenna alignment device 302 with respect to the antenna 304 (e.g., as shown in FIGS. 5A-5C).

Figures 4A, 4B, 4C:
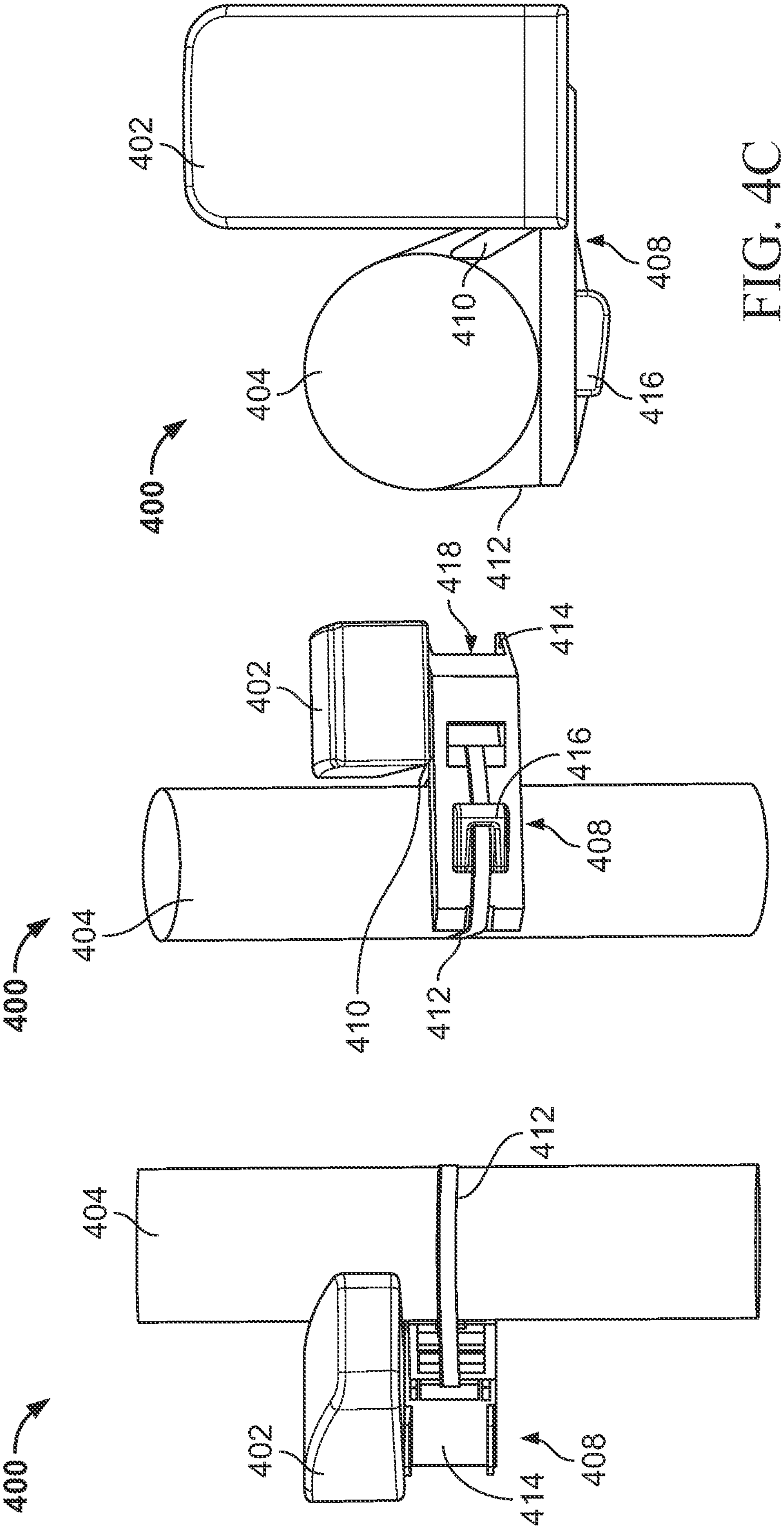
FIGS. 4A-4C show different perspective views of another example environment of using a mount for coupling an antenna alignment device with an antenna, based on the principles disclosed herein.

FIGS. 4A-4C show different perspective views of another example environment 400 of using a mount for coupling an antenna alignment device with an antenna, based on the principles disclosed herein. Particularly, FIG. 4A shows a front view, FIG. 4B shows a back view, and FIG. 4C shows a top view of a mount 408 coupling an antenna alignment device 402 with an antenna 404. In the illustrated example environment 400, the antenna 404 may be a 200 mm sector antenna.

The mount 408 may include a strap 412 and a strap base 418. The strap 412 may engage with the external surface of the antenna 404. To facilitate the engagement, the strap 412 may be connected to the strap base 418. Within the strap base 418, there may be a ratchet 416 that may be used to tighten or loosen the engagement of the strap 412 with the external surface of the antenna 404. The strap base 418 may also provide a coupling (e.g., a housing to receive a screw) for the antenna alignment device 402.

The strap base 418 may further comprise a canted wall 410. The canted wall 410 may be at an angle (e.g., not necessarily perpendicular) to the other walls of the strap base 418. Due to this angle, the canted wall 410 may have only one point of contact (alternatively, a single line of contact) with the external surface of the antenna 404. The point of contact (or line of contact) may be along an edge of the canted wall 410 that may abut against the external surface of the antenna 404. This edge abutment along a single point (or single line) of contact may allow the mount 408 to be coupled to antennas of non-planar form factors. For instance, the mount 408 may be coupled to a curved external surface of the antenna 404. The curved surface may not necessarily be the designed form factor of the antenna 404. The curved surface (or any other type of non-planar surface) may also be formed by warping and/or other imperfections within the surface of the antenna, and the canted wall 410 may generally be abutted to any point in the curve.

The canted wall 410 may allow for more flexibility and convenience of attachment compared to conventional planar brackets (often having perpendicular walls) that may have to be flush with the planar surfaces of an antenna. Because of the single point (or a single line) of contact, the form factor of the canted wall 410 does not necessarily have to match the form factor of the antenna, unlike the conventional planar brackets. Furthermore, as a flush (or a snug) fit is not necessarily required, the canted wall 410 may allow the strap base 418 to be clear from other obstructions within the antenna 404. For example, there may be components protruding from the external surface of the antenna 404 such as wires, imperfections, or the shape of antenna 404 itself; and the canted wall 410 may allow for the strap base 418 to be clear of the protruding components.

As shown, the strap 412 may engage with a first portion of the external surface of the antenna 404 and the canted wall 410 may engage with a second portion of the external surface of the antenna 404. The first portion and the second portion may be different to maintain a separate engagement of the strap 412 and the canted wall 410 with the antenna 404. Alternatively, the first and second portions may be at least partially overlapping for the strap 412 and the canted wall 410 to engage the antenna 404 at nearby locations or the same location. The force of engagement of the strap 412 and the canted wall 410 may be controlled using the ratchet 416. For example, when the ratchet 416 is tightened, the abutment force between the canted wall 410 and the corresponding portion of the external surface of the antenna 404 may increase. When the ratchet 416 is loosened, the abutment force between the canted wall 410 and the corresponding portion of the external surface of the antenna 404 may decrease.

FIGS. 5A-5C show different perspective views of another example environment 500 of using a mount for coupling an antenna alignment device with an antenna, based on the principles disclosed herein. Particularly, FIG. 5A shows a front view, FIG. 5B shows a back view, and FIG. 5C shows a top view of a mount 508 coupling an antenna alignment device 502 with an antenna 504. In the illustrated example environment 500, the antenna 504 may be a 457 mm sector antenna.

The mount 508 may include a strap 512 and a strap base 518. The strap 512 may engage with the external surface of the antenna 504. To facilitate the engagement, the strap 512 may be connected to the strap base 518. Within the strap base 518, there may be a ratchet 516 that may be used to tighten or loosen the engagement of the strap 512 with the external surface of the antenna 504. The strap base 518 may also provide a coupling (e.g., a housing to receive a screw) for the antenna alignment device 502.

The strap base 518 may further comprise a canted wall 510. The canted wall 510 may be at an angle (e.g., not necessarily perpendicular) to the other walls of the strap base 518. Due to this angle, the canted wall 510 may have a single point of contact (alternatively, a single line of contact) with the external surface of the antenna 504. The point of contact (or line of contact) may be along an edge of the canted wall 510 that may be abutted against the external surface of the antenna 504. This edge abutment along a single point (or single line) of contact may allow the mount 508 to be coupled to antennas of non-planar form factors. For instance, the mount 508 may be coupled to a curved external surface of the antenna 504. The curved surface may not necessarily be the designed form factor of the antenna 504. The curved surface (or any other type of non-planar surface) may also be formed by warping and/or other imperfections within the surface of the antenna, and the canted wall 510 may generally be abutted to any point in the curve.

The canted wall 510 may allow for more flexibility and convenience of attachment compared to conventional planar brackets (often having perpendicular walls) that may have to be flush with the planar surfaces of an antenna. Because of the single point (or a single line) of contact, the form factor of the canted wall 510 does not necessarily have to match the form factor of the antenna, unlike the conventional planar brackets. Furthermore, as a flush (or a snug) fit is not necessarily required, the canted wall 510 may allow the strap base 518 to be clear from other obstructions within the antenna 504. For example, there may be components protruding from the external surface of the antenna 504 such as wires, imperfections, or the shape of antenna 504 itself; and the canted wall 510 may allow for the strap base 518 to be clear of the protruding components.

As shown, the strap 512 may engage with a first portion of the external surface of the antenna 504 and the canted wall 510 may engage with a second portion of the external surface of the antenna 504. The first portion and the second portion may be different to maintain a separate engagement of the strap 512 and the canted wall 510 with the antenna 504. Alternatively, the first and second portions may be at least partially overlapping for the strap 512 and the canted wall 510 to engage the antenna 504 at nearby locations or the same location. The force of engagement of the strap 512 and the canted wall 510 may be controlled using the ratchet 516. For example, when the ratchet 516 is tightened, the abutment force between the canted wall 510 and the corresponding portion of the external surface of the antenna 504 may increase. When the ratchet 516 is loosened, the abutment force between the canted wall 510 and the corresponding portion of the external surface of the antenna 504 may decrease.

The strap base 518 may also include a second canted wall 514 that may be also be used for coupling the antenna alignment device 502 with the strap base 518. As seen in FIGS. 5B-5C, the coupling of the antenna alignment device 502 to the second canted wall 514 allows for an angular orientation of the antenna alignment device 502 with respect to the antenna 504 (compared to the orientation shown in FIGS. 4A-4C). This angular orientation may allow the antenna alignment device 502 to clear the physical interference from the relatively larger external surface of the antenna 504.

Figure 6B:
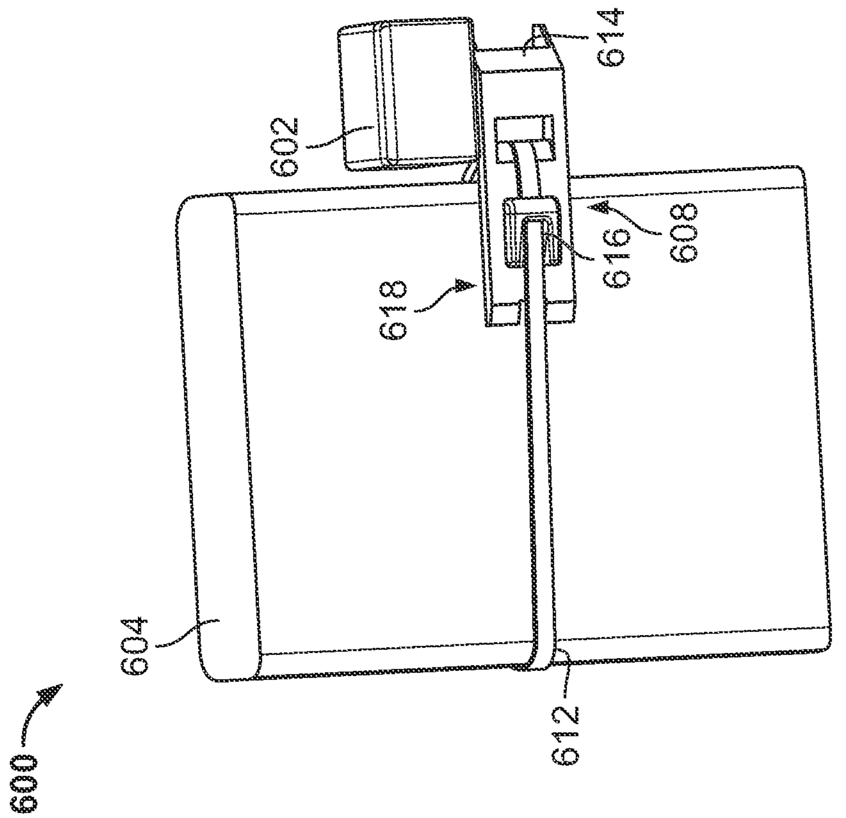
FIGS. 6A-6D show different perspective views of yet another example environment of using mount for coupling an antenna alignment device with an antenna, based on the principles disclosed herein.
Figure 6A:
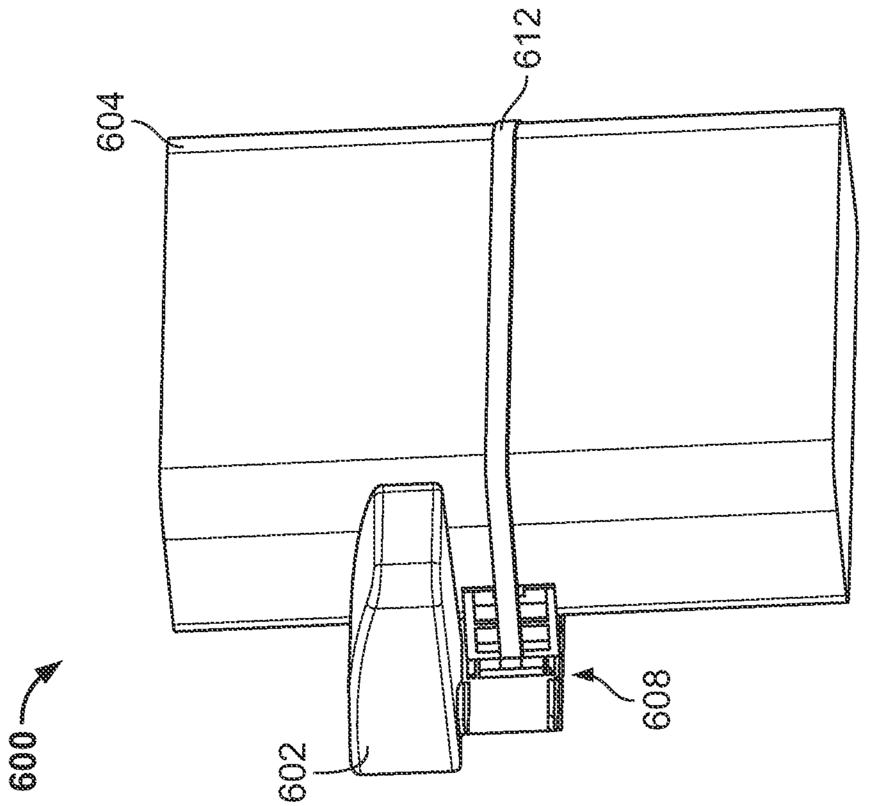
Figure 6C:
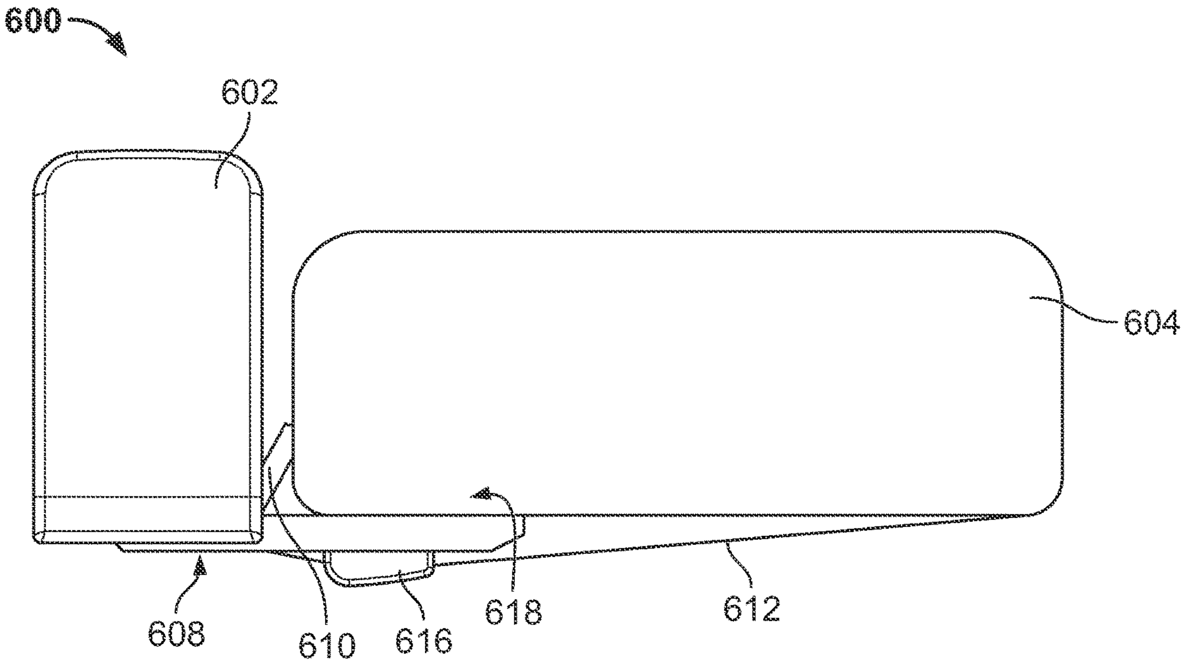
Figure 6D:
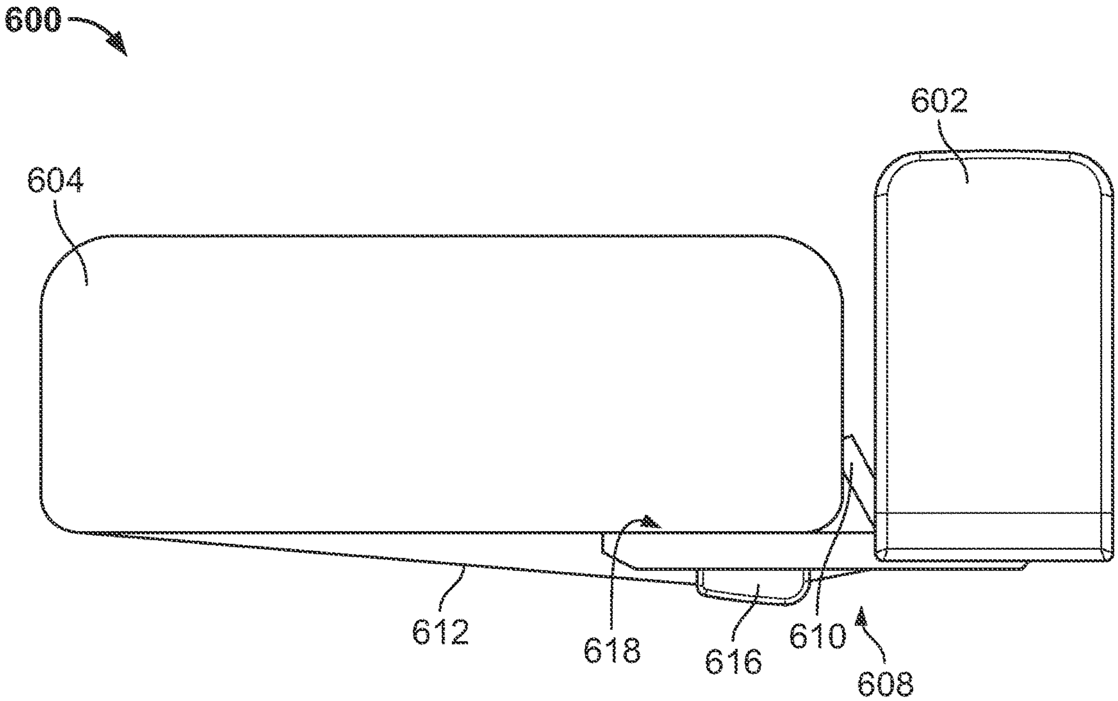

FIGS. 6A-6D show different perspective views of yet another example environment 600 of using a mount for coupling an antenna alignment device with an antenna, based on the principles disclosed herein. Particularly, FIG. 6A shows a front view, FIG. 6B shows a back view, FIG. 6C shows a top left hand view, and FIG. 6D shows a top right hand view of a mount 608 coupling an antenna alignment device 602 with an antenna 604. In the illustrated example environment 600, the antenna 504 may be 640 mm multibeam antenna.

The mount 608 may include a strap 612 and a strap base 618. The strap 612 may engage with the external surface of the antenna 604. To facilitate the engagement, the strap 612 may be connected to the strap base 618. Within the strap base 618, there may be a ratchet 616 that may be used to tighten or loosen the engagement of the strap 612 with the external surface of the antenna 604. The strap base 618 may also provide a coupling (e.g., a housing to receive a screw) for the antenna alignment device 602.

The strap base 618 may further comprise a canted wall 610. The canted wall 610 may be at an angle (e.g., not necessarily perpendicular) to the other walls of the strap base 618). Due to this angle, the canted wall 610 may have a single point of contact (alternatively, a single line of contact) with the external surface of the antenna 604. The point of contact (or line of contact) may be along an edge of the canted wall 610 that may abut against the external surface of the antenna 604. This edge abutment along a single point (or single line) of contact may allow the mount 608 to be coupled to antennas of non-planar form factors. For instance, the mount 608 may be coupled to a curved external surface of the antenna 604. The curved surface may not necessarily be the designed form factor of the antenna 604. The curved surface (or any other type of non-planar surface) may also be formed by warping and/or other imperfections within the surface of the antenna, and the canted wall 610 may be generally abutted to any point in the curve.

The canted wall 610 may allow for more flexibility and convenience of attachment compared to conventional planar brackets (often having perpendicular walls) that may have to be flush with the planar surfaces of an antenna. Because of the single point (or a single line) of contact, the form factor of the canted wall 610 does not necessarily have to match the form factor of the antenna, unlike the conventional planar brackets. Furthermore, as a flush (or a snug) fit is not necessarily required, the canted wall 610 may allow the strap base 618 to be clear from other obstructions within the antenna 604. For example, there may be components protruding from the external surface of the antenna 604 such as wires, imperfections, and/or the shape of the antenna 604 itself; and the canted wall 610 may allow for the strap base 618 to be clear of the protruding components.

As shown, the strap 612 may engage with a first portion of the external surface of the antenna 604 and the canted wall 610 may engage with a second portion of the external surface of the antenna 604. The first portion and the second portion may be different to maintain a separate engagement of the strap 612 and the canted wall 610 with the antenna 604. Alternatively, the first and second portions may be at least partially overlapping for the strap 612 and the canted wall 610 to engage the antenna 604 at nearby locations or the same location. The force of engagement of the strap 612 and the canted wall 610 may be controlled using the ratchet 616. For example, when the ratchet 616 is tightened, the abutment force between the canted wall 610 and the corresponding portion of the external surface of the antenna 604 may increase. When the ratchet 616 is loosened, the abutment force between the canted wall 610 and the corresponding portion of the external surface of the antenna 604 may decrease.

The strap base 618 may also include a second canted wall 614 that may be also be used for coupling the antenna alignment device 602 with the strap base 618. Although not shown in FIGS. 6A-6D, the coupling of the antenna alignment device 602 with the canted wall 614 may facilitate an angular orientation of the antenna alignment device 602 with respect to the antenna 604 (e.g., as shown in FIGS. 5A-5C).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A mount configured to couple an antenna alignment device to an antenna, the mount comprising:

a strap configured to engage with an external surface of the antenna and maintain a coupling between the antenna alignment device and the external surface of the antenna; and a strap base, that the strap is connected to, comprising a canted wall, being canted at a non-perpendicular angle with other walls of the strap base, the canted wall being configured to form an engagement contact with a corresponding portion of the external surface of the antenna, the engagement contact comprising a single line of contact formed by an abutment of an edge of the canted wall with the corresponding portion of the external surface of the antenna.

2. The mount of claim 1, wherein the canted wall is configured to form the engagement contact with a non-planar surface forming the corresponding portion of the external surface of the antenna.

3. The mount of claim 2, wherein the non-planar surface comprises a curved surface of the antenna's form factor.

4. The mount of claim 2, wherein the non-planar surface comprises an imperfection in the antenna's form factor.

5. The mount of claim 1, wherein the canted wall is configured to form the engagement contact with the corresponding portion of the external surface of the antenna, the antenna comprising at least one of a microwave antenna, omnidirectional antenna, sector antenna, or multi-beam antenna.

6. The mount of claim 1, wherein the external surface of the antenna engaging with the strap comprises portions of the external surface of the antenna, the portions being different from the corresponding surface of the antenna engaging the canted wall.

7. The mount of claim 1, wherein the canted wall is fixed with respect to the other walls of the strap base.

8. The mount of claim 1, further comprising a second canted wall, being canted at a non-perpendicular angle with other walls of the strap base, the second canted wall being configured to couple the antenna alignment device at an angular orientation with respect to the antenna.

9. The mount of claim 1, further comprising a ratchet configured to tighten the strap and increase the abutment force of the edge of the canted wall with the corresponding portion of the external surface of the antenna.

10. A mount configured to couple an antenna alignment device to an antenna, the mount comprising:

a first portion configured to engage with a first external surface of the antenna and maintain a coupling between the antenna alignment device and the antenna; and a second portion having a canted wall, being canted at a non-perpendicular angle with other walls of the mount, the canted wall being configured to form an engagement contact with a second external surface of the antenna, the engagement contact comprising a single line of contact formed by an abutment of an edge of the canted wall with the second external surface of the antenna.

11. The mount of claim 10, wherein the first external surface is different from the second external surface.

12. The mount of claim 10, wherein the first external surface at least partially overlaps the second external surface.

13. The mount of claim 10, comprising at least one of a strap clamp, a lip clamp, or an extension clamp.

14. The mount of claim 10, wherein the canted wall is configured to form the engagement contact with a non-planar surface forming the second external surface of the antenna.

15. The mount of claim 14, wherein the non-planar surface comprises a curved surface of the antenna's form factor.

16. The mount of claim 10, further comprising a second canted wall, being canted at a non-perpendicular angle with other walls of the mount, the canted wall being configured to couple the antenna alignment device at an angular orientation with respect to the antenna.

17. The mount of claim 10, wherein the canted wall is configured to form the engagement contact with the second external surface of the antenna, the antenna comprising at least one of a microwave antenna, omnidirectional antenna, sector antenna, or multi-beam antenna.

18. A method comprising:

engaging a strap with an external surface of an antenna to maintain a coupling between an antenna alignment device and the external surface of the antenna; and abutting a canted wall, the canted wall being canted at a non-perpendicular angle with other walls of a strap base that the strap is connected to, against a corresponding portion of the external surface of the antenna such that:

an edge of the canted wall forms a single line of engagement contact with the corresponding portion of the external surface of the antenna.

19. The method of claim 18, further comprising:

tightening the strap, via a ratchet at the strap base, such that an abutment force increases between the edge of the canted wall and the corresponding portion of the external surface of the antenna.

20. The method of claim 18, wherein the external surface of the antenna is non-planar.

* * * * *